United States Patent [19]
Perroud

[11] Patent Number: 5,202,800
[45] Date of Patent: Apr. 13, 1993

[54] COIL SWITCHING DEVICE

[75] Inventor: Philippe Perroud, Meylan, France

[73] Assignee: SGS-Thomson Microelectronics S.A., Gentilly, France

[21] Appl. No.: 782,248

[22] Filed: Oct. 28, 1991

[30] Foreign Application Priority Data

Oct. 29, 1990 [FR] France .................. 90/13740

[51] Int. Cl.$^5$ .................................................. G11B 5/09
[52] U.S. Cl. ...................................................... 360/62
[58] Field of Search ........................ 360/62, 61, 67, 68

[56] References Cited

U.S. PATENT DOCUMENTS

| | | |
|---|---|---|
| 3,959,817 | 5/1976 | Honjo et al. |
| 4,518,925 | 5/1985 | Fukasawa |
| 4,665,446 | 5/1987 | Takyama |
| 4,868,691 | 9/1989 | Kawasaki |
| 4,926,271 | 5/1990 | Aoki et al. ............... 360/62 |
| 5,016,122 | 5/1991 | Meunier et al. |

OTHER PUBLICATIONS

Patent Abstracts of Japan, vol. 7, No. 30, Feb. 5, 1983, "Magnetic Recording and Reproducing Device", Hisaharu Watanabe.
Hobrecht, "Electronically Switched Tape Audio Processor", *IEEE Transactions on Consumer Electronics*, vol. CE-24, No. 3, Aug., 1978, pp. 318-327.
Dufossez et al., "A Low Noise One Chip Playback Record Head Amplifier For VCR", *International Conference on Consumer Electronics*, Jun., 1988, pp. 28-29.

*Primary Examiner*—Vincent P. Canney
*Attorney, Agent, or Firm*—Lowe, Price, Leblanc & Becker

[57] ABSTRACT

A device switches a coil (2) between a first state (REC) where it is connected between a supply source ($V_{REC}$) and ground through a variable current source ($I_{REC}$), and a second state (PB) where it is connected between ground and the input of an amplifier (3) through a coupling capacitor (CC). The device comprises a first controlled switch ($T_{PB}$) connected in parallel to the current source ($I_{REC}$); a second controlled switch ($T_{REC}$) placed between the supply source ($V_{REC}$) and the coil (2); a threshold comparator (4, $V_T$), the inputs of which are connected across the capacitor (CC); a logic control circuit (5) receiving a state control signal (REC/PB) and the output signal ($V_C$) of the threshold comparator (4, $V_T$) and, as a function of these signals, alternatively controlling switches ($T_{PB}$, $T_{REC}$) with no overlapping of their closed states.

6 Claims, 2 Drawing Sheets

COIL SWITCHING DEVICE

BACKGROUND OF THE INVENTION

The present invention relates to a device for switching a coil from a state where a current is forced through it to a state where it delivers a current. The invention more particularly concerns the switching of the coil in a record/play-back head of a video tape recorder.

In play-back mode, one of the terminals of the coil is grounded and the voltage on the other terminal is detected. In record mode, the terminal which was grounded is connected to a current source and the other terminal is connected to a supply voltage, means being provided for modulating the current source and forcing current through the coil as a function of the signal to be recorded.

When it is desired to switch from one mode to another, the coil is subject to two dangers liable to damage it: it can be connected between ground and the supply voltage for a short period, which would cause a high current surge because it has a low impedance, and it can be crossed by a discharge current peak of the coupling capacitor to an amplifier, as will be seen hereafter.

In the prior art, to solve these problems, the devices that have been designed are difficult to integrate and comprise a large amount of switches, the operation of which has to be carefully synchronized by complex processes.

French patent application no. 2 628 877 filed on Mar. 18, 1988 describes a particularly simple switching device, comprising a small number of switches easily integrable. The circuit described in this document has only two switches, but one of these switches, as well as three surrounding components, is not integrated.

An object of the invention is to provide a coil switching device with no external components.

SUMMARY OF THE INVENTION

To achieve this object and others, the invention provides a coil switching device between a first state where it is connected between a supply source and ground through a variable current source and a second state where it is connected between ground and the input of an amplifier through a coupling capacitor, comprising a first controlled switch connected in parallel to the current source; a second controlled switch placed between the supply source and the coil; a threshold comparator, the inputs of which are connected across the capacitor; a logic control circuit receiving a state control signal and the output signal of the threshold comparator and, as a function of these signals, alternately controlling the switches with no overlapping of their closed states.

According to one aspect of the invention, when a predetermined edge of the control signal occurs, the control circuit immediately opens the first switch and closes the second switch after a predetermined time interval.

According to another aspect of the invention, when the other edge of the control signal occurs, the control circuit immediately opens the second switch and closes the first switch when the threshold comparator switches to a predetermined state.

According to a further aspect of the invention, the threshold comparator switches to the predetermined state when the voltage across the capacitor becomes lower than a predetermined positive threshold voltage.

According to another aspect of the invention, the voltage across the coupling capacitor decreasingly reaches the predetermined threshold voltage after a second time interval starting at the switching off of the second switch.

According to yet another aspect of the invention, the second time interval is equal to the sum of a third time interval depending on the discharge time of the capacitor through the current source to a determined level and a fourth time interval depending on the discharge time of the capacitor through a biasing resistor of the amplifier until the voltage across the capacitor is equal to the threshold voltage of the threshold comparator.

BRIEF DESCRIPTION OF THE DRAWINGS

The foregoing and other objects, features and advantages of the invention will be apparent from the following detailed description of a preferred embodiment as illustrated in the accompanying figures wherein.

DETAILED DESCRIPTION OF THE INVENTION

Figure 1:
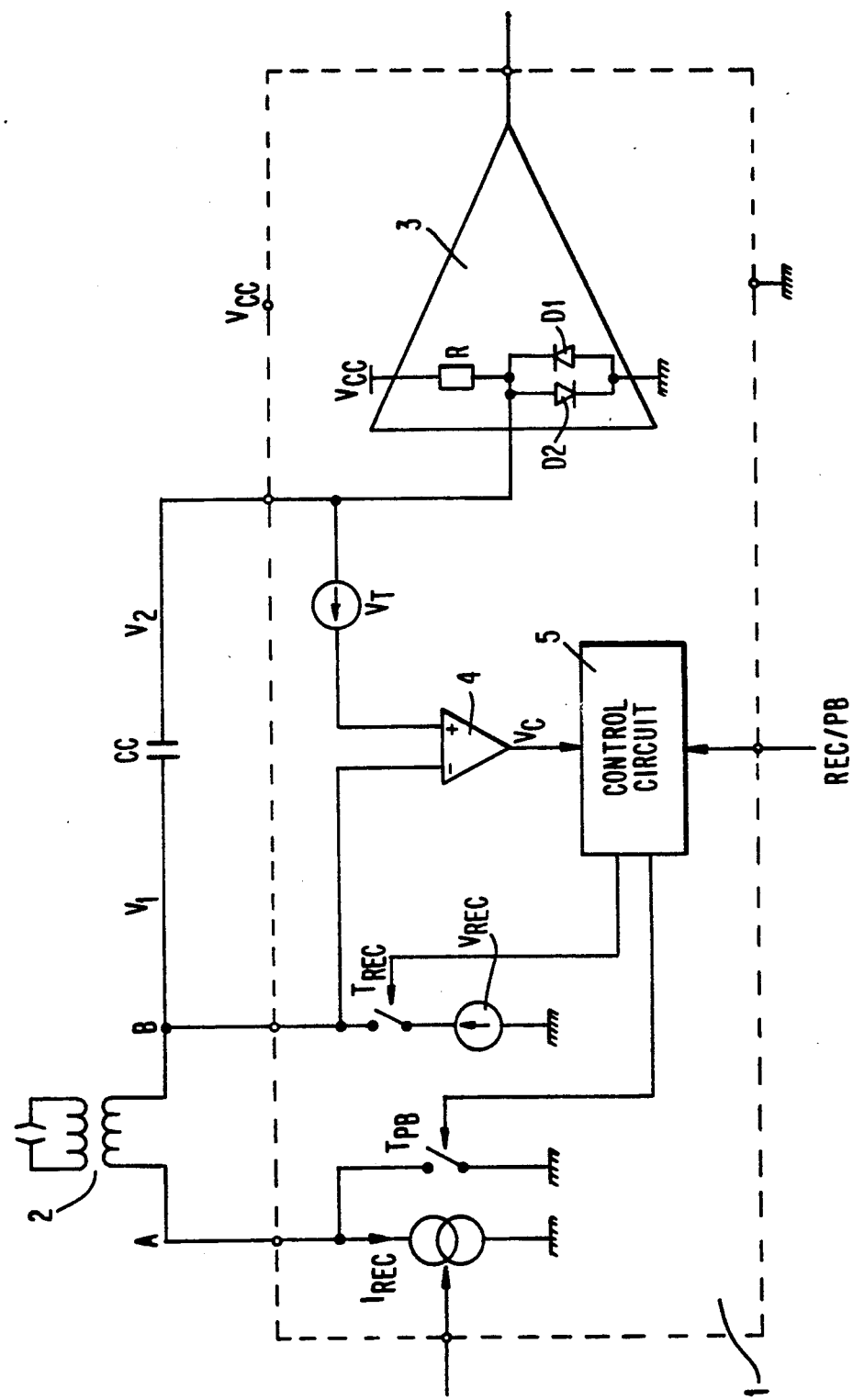
FIG. 1 shows an embodiment of the invention.

FIG. 1 shows an integrated circuit 1 comprising, amongst others, all the components required for the switching of a coil, here a record/play-back head 2 of a video tape recorder. The only inevitable external components are head 2 and a coupling capacitor CC. A first terminal A of head 2 is connected to a current source $I_{REC}$, that can be modulated by an external signal; the current source is connected to ground and can be short-circuited by a controllable switch $T_{PB}$. The second terminal B of the head is connected to a voltage source $V_{REC}$ through a second controllable switch $T_{REC}$. Terminal B is also coupled to the input of a play-back amplifier 3 through the coupling capacitor CC.

A comparator 4 compares the voltage $V_1-V_2$ across capacitor CC to a fixed positive threshold voltage $V_T$ obtained, for example, by a diode. A logic control circuit 5 receives the output signal $V_C$ of comparator 4 and an external control signal REC/PB determining the switching to the record or play-back mode. The control circuit 5 controls switches $T_{PB}$ and $T_{REC}$ in a way that will be explained hereafter.

Amplifier 3 comprises at the input an NPN transistor (not shown) in a common emitter configuration, the base of which, biased by a high impedance R, constitutes the amplifier input. Therefore, the input acts as a diode D1 passingly connected to ground. Moreover, the input is protected against negative voltage excursions by a diode D2 reverse connected to ground. Thus, amplifier 3 has a low input impedance for input voltages tending to be higher than $V_{BE}$ (base-emitter junction voltage of the transistor) and lower than $-V_{BE}$. Between these two limits, the amplifier has an input impedance substantially equal to impedance R.

Figure 2:
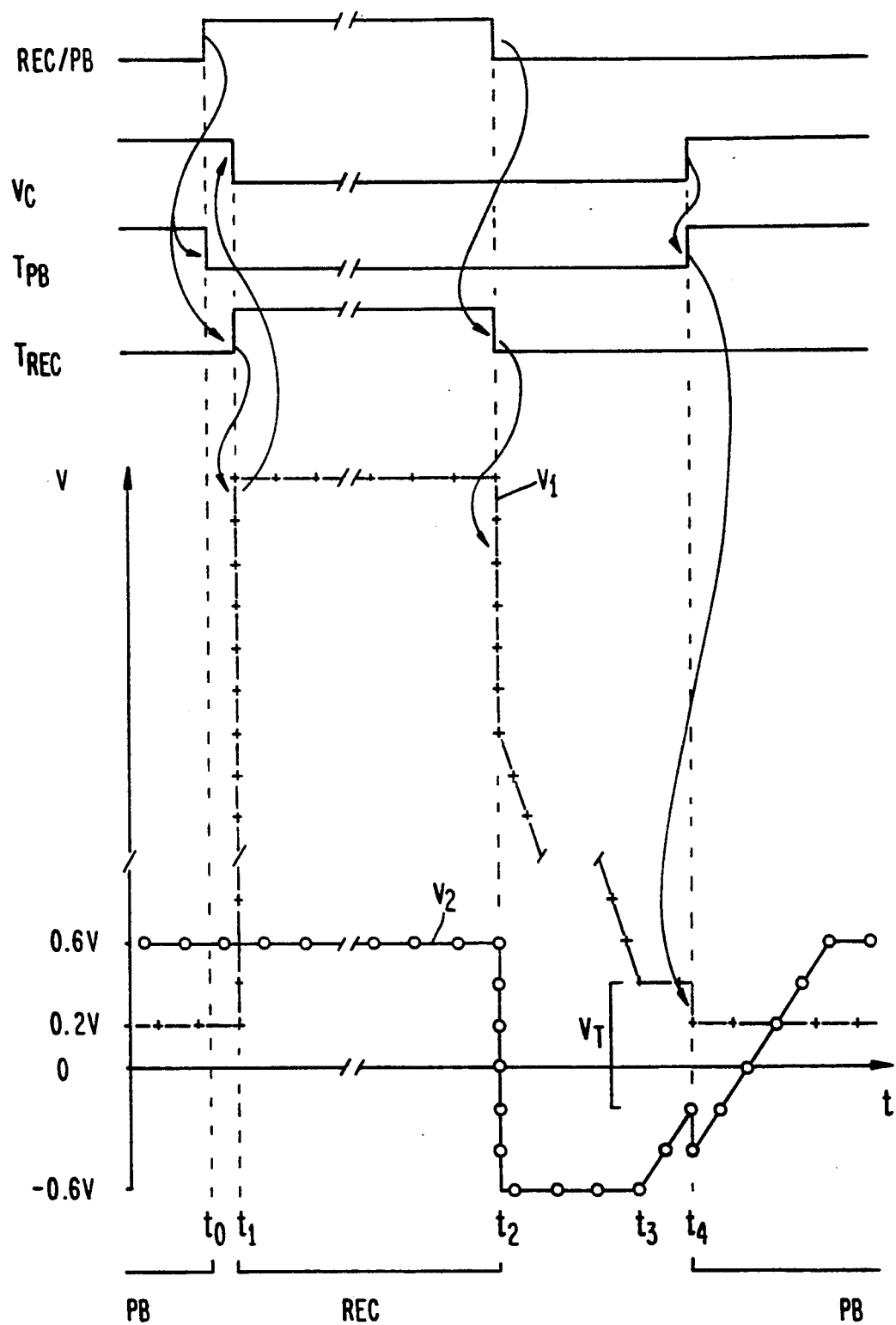
FIG. 2 represents waveforms illustrating the operation of the circuit of FIG. 1.

To understand the operation of the circuit, reference will be made to FIG. 2, wherein:

curve REC/PB shows the evolutions of the external logic signal REC/PB, the low state of which corresponds to the play-back mode and the high state to the record mode;

curve $V_C$ shows the evolutions of the output signal $V_C$ of comparator 4, which is at a high level when the voltage $V_1-V_2$ across capacitor CC is lower than the threshold voltage $V_T$;

curves $T_{REC}$ and $T_{PB}$ represent the states of switches $T_{REC}$ and $T_{PB}$, respectively, the high level corresponding to their closed state; and curves $V_1$ and $V_2$ show the evolutions of voltages $V_1$ and $V_2$. $V_1$ designates the voltage between terminal B of head 2 and ground. It will be assumed that this voltage is also present on terminal A of head 2 because the impedance of head 2 is very low and the voltage between its terminals with respect to the voltages involved here is negligible. $V_2$ designates the voltage between the amplifier input and ground.

It is assumed that initially the circuit is in play-back mode (PB). Signal REC/PB is low. Switch $T_{REC}$ is open and switch $T_{PB}$ is closed. Voltage $V_1$ is practically equal to null, for example equal to the saturation voltage (about 0.2 V) of a bipolar transistor eventually constituting switch $T_{PB}$, and voltage $V_2$ is equal to the voltage $V_{BE}$ imposed by diode D1 biased by impedance R. Thus, $V_C$ is high because $V_1-V_2$ is negative and therefore lower than $V_T$.

At a time $t_0$, it is desired to switch to record mode (REC). Signal REC/PB is set high. The control circuit 5 immediately opens switch $T_{PB}$ and closes switch $T_{REC}$ after a predetermined time interval $t_1-t_0$, for example 1 microsecond, for fully opening switch $T_{PB}$ before closing switch $T_{REC}$.

At a time $t_1$, voltage $V_1$ rises almost instantaneously practically to the value of the voltage source $V_{REC}$. Voltage $V_2$ remains constant and equal to $V_{BE}$. The coupling capacitor CC is then charged at $V_{REC}-V_{BE}$. Voltage $V_1-V_2$ across the capacitor then exceeds the threshold voltage $V_T$ and the output $V_C$ of comparator 4 goes low. The control circuit 5 is chosen in order not to modify the state of switches $T_{REC}$ and $T_{PB}$ in response to this transition occurring while signal REC/PB is high.

Between times $t_1$ and $t_2$, the record mode is thus activated. Switch $T_{REC}$ is closed and switch $T_{PB}$ is open, and head 2 is crossed by the record current $I_{REC}$.

At time $t_2$, it is desired to change over to playback mode. Signal REC/PB is set low and switch $T_{REC}$ is immediately opened, switch $T_{PB}$ remains open. The current source $I_{REC}$ then discharges the coupling capacitor CC through diode D2, voltage $V_2$ abruptly drops from VBE to $-V_{BE}$ and voltage $V_1$ drops of the same value ($2V_{BE}$). Voltage $V_2$ remains constant at $-V_{BE}$ and voltage $V_1$ linearly decreases until a time $t_3$ where it reaches about 0.4 V, a value below which the variable current source can no longer supply a constant current.

From time $t_3$, the coupling capacitor CC is still discharged, but through the biasing impedance R of the amplifier input and the variable current source, which acts as a voltage source of about 0.4 V, as long as the current flowing therethrough does not reach its nominal current. Therefore, voltage $V_1$ remains constant at about 0.4 V, voltage $V_2$ slowly rises and voltage $V_1-V_2$ across the capacitor reaches the threshold voltage $V_T$, here chosen equal to about 0.6 V, at a time $t_4$.

At time $t_4$, comparator 4 switches and its output $V_C$ goes high. The control circuit 5 closes switch $T_{PB}$. Voltage $V_1$ drops to its initial value (0.2 V), which also causes an equal drop of voltage $V_2$. Voltage $V_1$ remains constant at 0.2 V and voltage $V_2$ progressively reaches the input biasing voltage of amplifier 3 after finishing a discharge, capacitor CC is recharged in reverse direction through the input impedance R of the amplifier and switch $T_{PB}$.

Head 2 never bears voltage $V_{REC}$ across its terminals, which would be caused by the simultaneous closing of switches $T_{PB}$ and $T_{REC}$, and neither does it bear current peaks which would be caused by a discharge of capacitor CC through diode D2 and switch $T_{PB}$ which is closed when switching from record mode to play-back mode. It will be noted that the specific configuration of the input of amplifier 3 and the coupling capacitor CC have been used for ensuring the operation of the circuit for switching from record to play-back mode, which greatly simplifies the configuration of the control circuit 5 and makes it possible to substantially decrease the number of required components.

In brief, the control circuit 5 is chosen to operate as follows: when signal REC/PB is set high, it immediately opens switch $T_{PB}$ and closes switch $T_{REC}$ after a predetermined time interval; and when signal REC/PB is set low, it immediately opens switch $T_{REC}$ and closes switch $T_{PB}$ when it receives a rising edge of signal $V_C$ from comparator 4.

The circuit described hereabove corresponds to a specific embodiment in bipolar technology and some of the given values depend on this technology. Of course, a mixed MOS-bipolar technology can be selected if this solution provides advantages, such as simplification of the circuit and/or a gain in surface, and the given values depending on the technology will be different. The time interval $t_1-t_0$ may have different values, provided that it is greater than the switching time of a switch. The value of the threshold voltage $V_T$ may also have different values provided that the comparator switches between the time ($t_3$) when the current source has finished discharging capacitor CC and the time when voltage $V_2$ joins voltage $V_1$.

I claim:

1. A switching device for switching a coil between a first state where it is connected between a supply source and ground through a variable current source and a second state where it is connected between ground and the input of an amplifier through a coupling capacitor comprising:
    a first controlled switch connected in parallel to the current source;
    a second controlled switch placed between the supply source and said coil;
    a threshold comparator, the inputs of which are connected across the capacitor;
    a logic control circuit receiving a state control signal and the output signal of the threshold comparator and, as a function of said signals, alternatively controlling said switches, with no overlapping of their closed states.

2. A switching device according to claim 1, wherein, said control circuit is responsive to a predetermined edge of the control signal to immediately open the first switch and close the second switch after a predetermined time.

3. A switching device according to claim 1, wherein, said control circuit is responsive to the other edge of said control signal to immediately open the second switch and close the first switch when said threshold comparator switches to a predetermined state.

4. A switching device according to claim 3, wherein said threshold comparator switches to the predetermined state when the voltage across the capacitor becomes lower than a predetermined positive threshold voltage.

5. A switching device according to claim 4, wherein said voltage across said coupling capacitor decreasingly reaches the predetermined threshold voltage after a second time interval after the opening of the second switch.

6. A switching device according to claim 5, wherein said second time interval is equal to the sum of a third time interval depending on the discharge time of said capacitor through the current source to a determined level and of a fourth time interval depending on the discharge time of the capacitor through a biasing resistor of the amplifier until the voltage across the capacitor is equal to the threshold voltage of the threshold comparator.

* * * * *